(12) United States Patent
Kanie

(10) Patent No.: US 6,557,927 B2
(45) Date of Patent: May 6, 2003

(54) SIDE VISOR FASTENER

(75) Inventor: Hideki Kanie, Toyohashi (JP)

(73) Assignee: NewFrey LLC, Newark, DE (US)

( * ) Notice: Subject to any disclaimer, the term of this patent is extended or adjusted under 35 U.S.C. 154(b) by 0 days.

(21) Appl. No.: 10/194,641

(22) Filed: Jul. 12, 2002

(65) Prior Publication Data

US 2003/0025355 A1 Feb. 6, 2003

(30) Foreign Application Priority Data

Jul. 30, 2001 (JP) ........................................ 2001-229328

(51) Int. Cl.[7] .................................................. B60J 3/00
(52) U.S. Cl. ...................................................... 296/152
(58) Field of Search .............................. 296/152, 154; 454/128, 131, 135

(56) References Cited

U.S. PATENT DOCUMENTS 5,251,953 A * 10/1993 Willey ........................ 296/152

FOREIGN PATENT DOCUMENTS

| JP | 63-265723 | * 11/1988 |
|---|---|---|
| JP | 63-279924 | * 11/1988 |

* cited by examiner

Primary Examiner—Joseph D. Pape
(74) Attorney, Agent, or Firm—Edward D. Murphy

(57) ABSTRACT

A side visor fastener (1) includes a retainer (25) to be fixed to a mounting portion (11) of a frame (3), and an interconnected receiver clip element (26) and pin clip element (27) with the combination used to fasten a side visor (1) to a door frame (3). The receiver clip element (26) disposed on the rear side of the side visor (1), and a pin clip element (27) to be inserted from the front side of the side visor (1) into the receiver clip element (26) through the side visor (1) so as to engage with the receiver clip element (26). The receiver clip element (26) is hingedly connected with the retainer (25) through a shaft (29) and a bearing (30) in a swingable manner in response to the inclination of the side visor (1) with respect to the frame (3), and the receiver clip element (26) serves as a portion of the fastener (1) and extends from the retainer (25) to support the side visor (1). The side visor (1) is fixed to the frame (3) through the retainer (25) while the side visor (1) is sandwiched between the receiver clip element (26) and the pin clip element (27).

7 Claims, 8 Drawing Sheets

SIDE VISOR FASTENER

BACKGROUND OF THE INVENTION

The present invention relates to a side visor fastener for fixing a side visor of a motor vehicle to a frame such as a door frame of a vehicle body.

A conventional fastener for a side visor and a side visor fastening process will be described with reference to FIGS. 1, 2 and 3. In FIG. 1, a side visor 1 is fixed, for example at two positions, to a door frame 3 positioned at the upper portion of a door glass 2. A backseat-side visor 1A is also fixed to a frame positioned at the upper portion of a backseat-side door glass 2A. A conventional side visor fastener 5 for fixing the side visor 1 to the frame 3 is shown in FIGS. 2 and 3, which are sectional views taken along the line A—A of FIG. 1. FIG. 2 shows a process for fixing the side visor 1, and FIG. 3 shows the state after the side visor 1 is fixed to the frame 3.

In FIG. 2, the frame 3 is formed with a retaining portion 7 into which a sealing rubber 6 for receiving the door grass is fitted. The frame 3 is also formed with a bonding surface 9 with which the upper portion of the side visor 1 is brought into surface contact. The lower portion of the bonding surface 9 defines a part of the retaining portion 7 and additionally serves as a mounting portion 11 to which a retainer 10 of the side visor fastener 5 is fixed. The retainer 10 is formed of a metal plate member. For fixing the side visor 1 to the frame 3, the upper portion of the side visor 1 is first attached to the bonding surface 9 of the door frame 3 by means of a double-sided adhesive tape or the like. Then, an attaching portion 13 of the retainer 10 is pushed into the mounting portion 11 of the frame 3 as shown by the arrow 14 to fix the retainer 10 to the frame 3. The retainer 10 includes an extending portion 15 extending along the rear side of the side visor 1, and the extending portion 15 is formed with a fastening hole 18 to be aligned with a fastening hole 17 of the side visor 1. The sealing rubber 6 is then pushed into the retaining portion 7 of the frame 3 in the direction of the arrow 19 and is held by the retaining portion 7. In this state, as shown by the phantom line in FIG. 3, the extending portion 15 of the retainer 10 and the side visor 1 are sandwiched by a clip comprising a pin clip element 21 and a receiver clip element 22 to fasten the side visor 1 to the extending portion 15 of the retainer 10. The receiver clip element 22 has a hollow tubular portion capable of passing through the fastening hole 17 of the side visor 1 and the fastening hole 18 of the retainer 10. When the pin clip element 21 is inserted into the tubular portion of the receiver clip element 22, an engagement portion of the pin clip element 21 engages with an engagement pawl of the receiver clip element 22, and thereby the pin and receiver clip elements fasten the side visor 1 to the retainer 10 by sandwiching the retainer 10 and the side visor 1 therebetween. Since the retainer 10 is fixed to the frame 3, the side visor 1 is also fixed to the frame 3 through the retainer 10. By fastening the side visor 1 to the retainer 10 in this way, the side visor 1 as attached by the double-sided adhesive tape is firmly fixed to the frame 3.

The aforementioned conventional side visor fastener includes a retainer to be fixed to the mounting portion of the frame, and a clip for fastening the side visor to the portion of the fastener extending from the retainer as fixed to the frame to the side visor. Further, the clip comprises the receiver clip element to be disposed on the rear side of the side visor and the pin clip element to be inserted from the front side of the side visor into the receiver clip element through the side visor so as to engage with the receiver clip element. Thus, the conventional side visor fastener has an advantage of a simple structure. Further, its assembling operation is advantageously facilitated as described above. However, as the design of the side visor is varied depending on types of motor vehicles, the inclination of the side visor with respect to the frame will be variously changed. As a result, a large number of differently sized retainers have heretofore been required to cope with various types and styles of motor vehicles. In particular, as for similar side visors, various corresponding retainers have to be prepared and managed, and each of the retainers has to be fixed to a frame of the corresponding type of motor vehicle without failure. This requires costs and times for preparing the variously sized retainers and managing them, and can undesirably give rise to the risk of attaching an improper retainer or a wrong assembly, during the operation for fixing the retainer to the frame.

In the prior art, it is known to use a clip that has a female member and a male member, wherein after temporarily attaching a component such as an assist grip to a first panel such as a roof lining with the female member, the first panel is aligned with and pushed toward a second panel such as a vehicle body to temporarily attach the component to the second panel with a leg portion of the female member, and then the male member is inserted into the female member to fixedly attach the component to the second panel without any loosing in connection. This clip is directed to temporarily attach the component such as an assist grip to the first panel such as a roof lining and the second panel such as a vehicle body, and then fixedly attach the component to the second panel. Thus, this clip is not suitable for fixing a side visor to a frame with simplified structure and facilitated assembling operation.

SUMMARY OF THE PRESENT INVENTION

According to the present invention, there is provided a side visor fastener for fixing a side visor to a frame of a vehicle body, including a retainer to be fixed to a mounting portion of the frame and a clip for fastening the side visor to a portion of the fastener extending from the retainer as fixed to the frame to the side visor. The clip includes a receiver clip element disposed on the rear side of the side visor and a pin clip element to be inserted from the front side of the side visor into the receiver clip element through the side visor so as to engage with the receiver clip element. In the fastener according to the present invention, the receiver clip element is hingedly connected with the retainer through a shaft and a bearing in a swingable manner in response to the inclination of the side visor with respect to the frame, and the receiver clip element is served as the portion of the fastener extending from the retainer to support the side visor, whereby the side visor is fixed to the frame through the retainer while the side visor is sandwiched between the receiver clip element and the pin clip element.

According to the above mentioned fastener, the receiver clip element can swing with respect to the retainer in line with the inclination of the side visor with respect to the frame, and the receiver clip element serves as the portion of the fastener extending from the retainer to support the side visor. Thus, even if a mounting angle (or the inclination) of the side visor with respect to the frame varies, the side visor can be adequately supported only by swinging the receiver clip element with respect to the retainer in each case. That is, even if the angle of the side visor is varied, a structurally and dimensionally identical fastener comprising the retainer and the receiver and pin clip elements can be used. This solves the problem of undesirable costs and times for preparing the various retainers and managing them, and eliminates the risk of occurrence of the wrong assembly of improper retainers during the operation for fixing the retainer to the frame.

In the above side visor fastener, the retainer and receiver clip element may be made of plastic material. Thus, the retainer and receiver clip element can be molded in the same forming dies. The retainer and receiver clip elements may be integrally formed or molded with each other in partially connected condition.

Further, in the above fastener, the frame may be a door frame for receiving a door glass. In that case, the door frame is formed with a retaining portion into which a sealing rubber for receiving the door grass is fitted, and the retainer may includes an extended portion extending from the mounting portion of the door frame to the retaining portion of the door frame. The extended portion of the retainer may be pressed and held by the sealing rubber in the retaining portion. This provides highly maintained mounting strength even if the retainer is made of plastic material.

The shaft and the bearing, both of which connect the retainer and the receiver clip element with each other, may have a certain radial clearance therebetween for preventing an unconformity due to an offset in position between a swing axis of the receiver clip element with respect to the retainer and a center of angular variations of the side visor.

The receiver clip element may include an engagement pawl for receiving an enlarged engagement portion of the pin clip element, and the engagement pawls may be formed in a plate shape extending in the longitudinal direction of the retainer. This can absorb a displacement between a pin-clip element receiving hole of the receiving clip element and a fastening hole of the side visor in the longitudinal direction of the retainer.

The shaft and bearing may also have a certain axial clearance allowing one of them to be moved in the axial direction of the shaft within the extent that the disengagement therebetween is prevented. This can absorb a displacement between the pin-clip element receiving hole of the receiving clip element and the fastening hole of the side visor in the axial direction.

Accordingly, it is an object of the present invention to provide a side visor fastener capable of coping with variations in a mounting angle or inclination of a side visor with respect to a frame, while keeping conventional advantages of simplified structure and facilitated assembling operation.

It is another object of the present invention to provide a side visor which overcomes the disadvantages of the prior art and provides a reliable connection between the bolt and the frame of various types and styles of motor vehicles.

It is still another object of the present invention to provide a side visor fastener which is relatively inexpensive, which is simple to produce and easy to assemble.

BRIEF DESCRIPTION OF THE ACCOMPANYING DRAWINGS

Additional advantages and features of the present invention will become apparent from the subsequent description, taken in conjunction with the accompanying drawings wherein:

FIGS. 9A, 9B and 9C show a pin clip element of a side visor fastener according to the present invention, wherein FIG. 9A is a top plan view of the pin clip element, FIG. 9B being a front view of the pin clip element, and FIG. 9C is a partial bottom view of the pin clip element.

DETAILED DESCRIPTION OF THE INVENTION

Figure 9A:
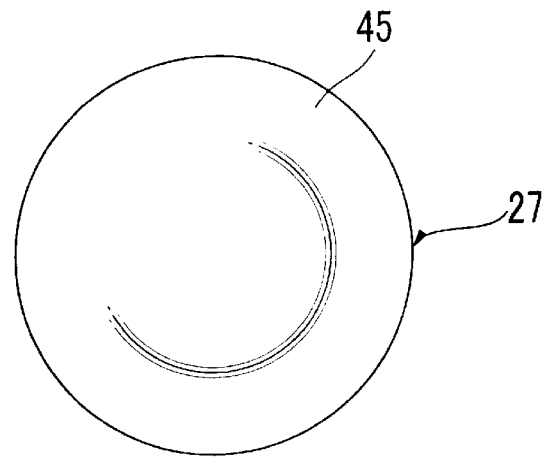
Figure 9B:
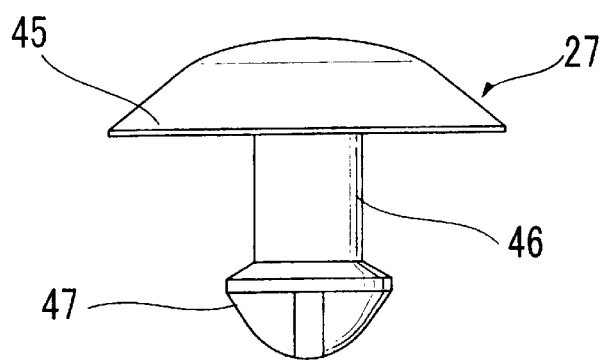
Figure 9C:
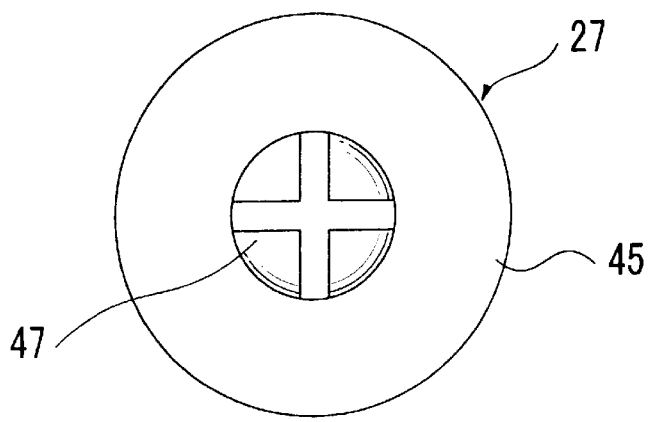
Figure 10:
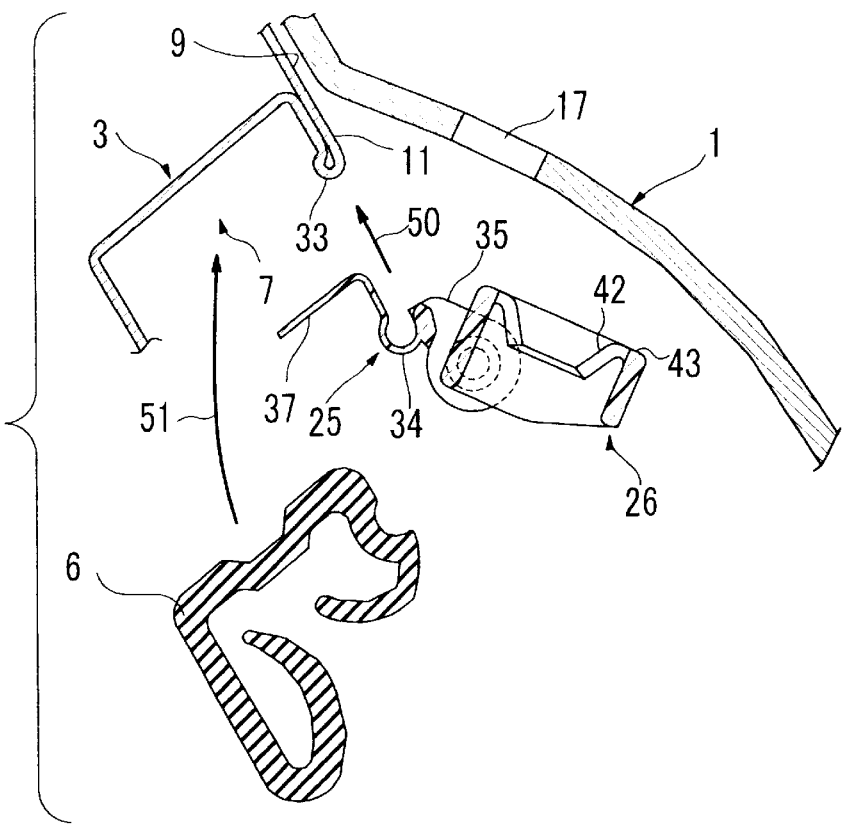
FIG. 10 is a sectional view taken along the line A—A of FIG. 1, showing before the side visor is fixed by use of a side visor fastener according to the present invention,.
Figure 11:
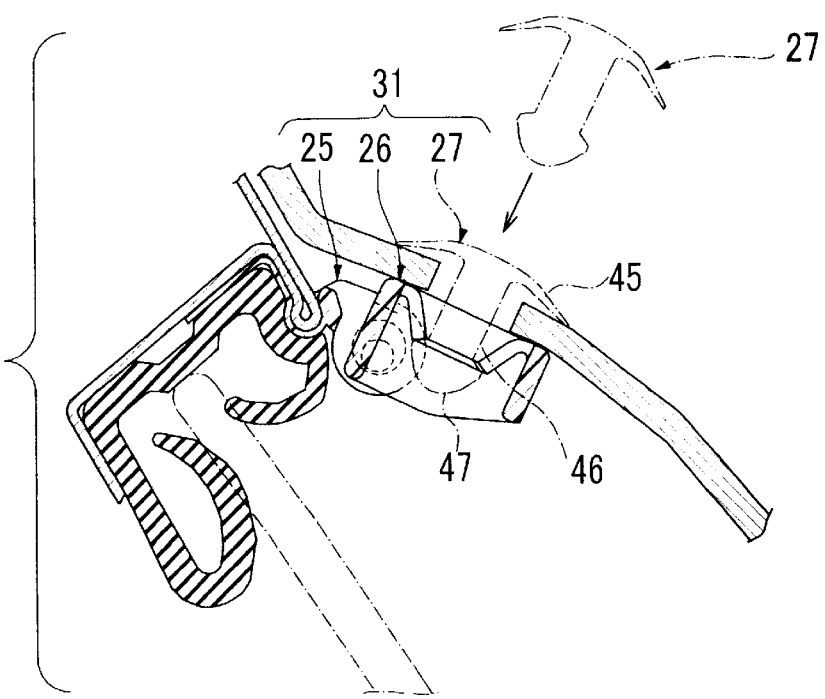
FIG. 11 is a sectional view taken along the line A—A of FIG. 1 showing after the side visor is fixed by use of a side visor fastener according to the present invention,.
Figure 12:
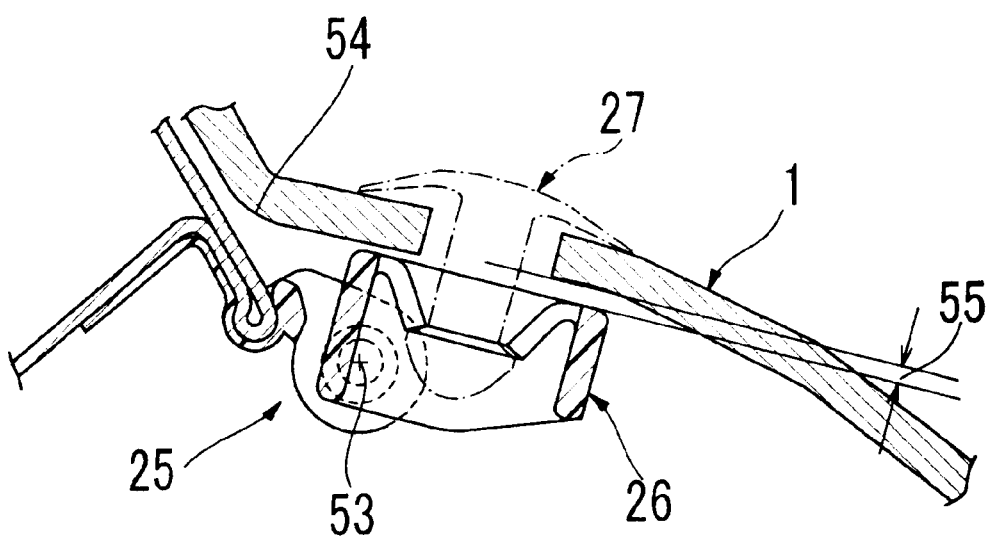
FIG. 12 is an illustration for explaining the possibility of an unconformity due to an offset in position between a swing axis of a receiver clip element with respect to a retainer and a center of angular variations of a side visor, and the reason why the fastener of the present invention can absorb the unconformity.

With reference to the drawings, embodiments of the present invention will now be described. FIGS. 4 to 9 show details of a retainer 25, a receiver clip element 26 and a pin clip element 27, which compose a main component of a side visor fastener according to the preferred embodiment of the present invention. As illustrated in FIGS. 4 to 8, the retainer 25 and the receiver clip element 26 are formed as a single unit by hingedly connecting them with one another through a shaft 29 and a bearing 30. As shown in FIGS. 9A, 9B and 9C, the pin clip element 27 is a single component to be inserted into and connected to the receiver clip element 26. FIGS. 10, 11 and 12 show an operation for fixing a side visor 1 to a frame 3 by use of a side visor fastener 31 (see FIG. 11) according to the present invention. In the preferred embodiment, the retainer 25, the receiver clip element 26 and the pin clip element 27 are all made of plastic material. Although the retainer and the clip element can be made of metal, it is preferable to make them from plastic material. This allows the retainer 25 and the receiver clip element 26 to be formed or molded integrally, which provides simplified molding and machining processes, lowered cost, and facilitated parts management.

Figure 1:
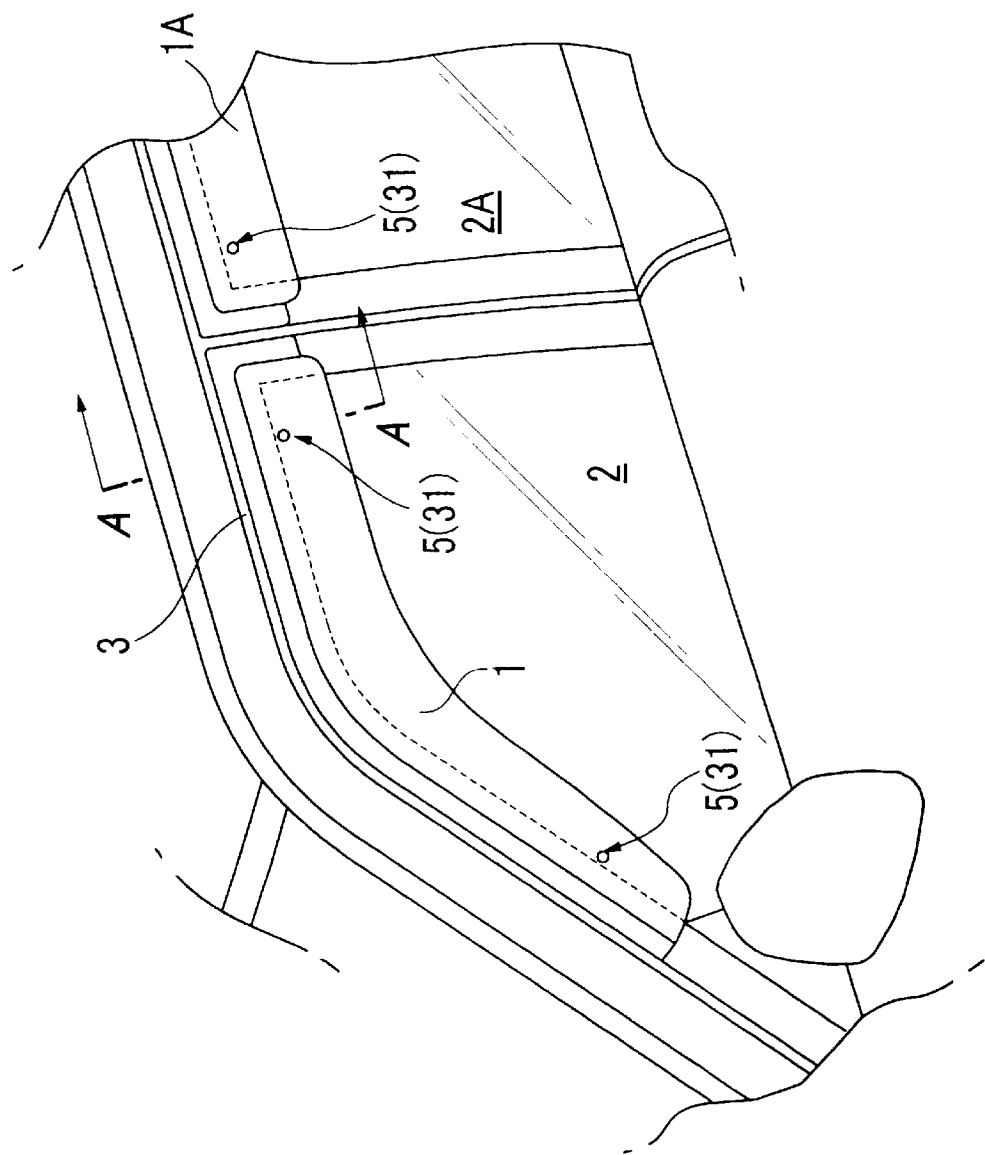
FIG. 1 is a partial perspective view of a motor vehicle in the state that a side visor is fixed to a frame.
Figure 2:
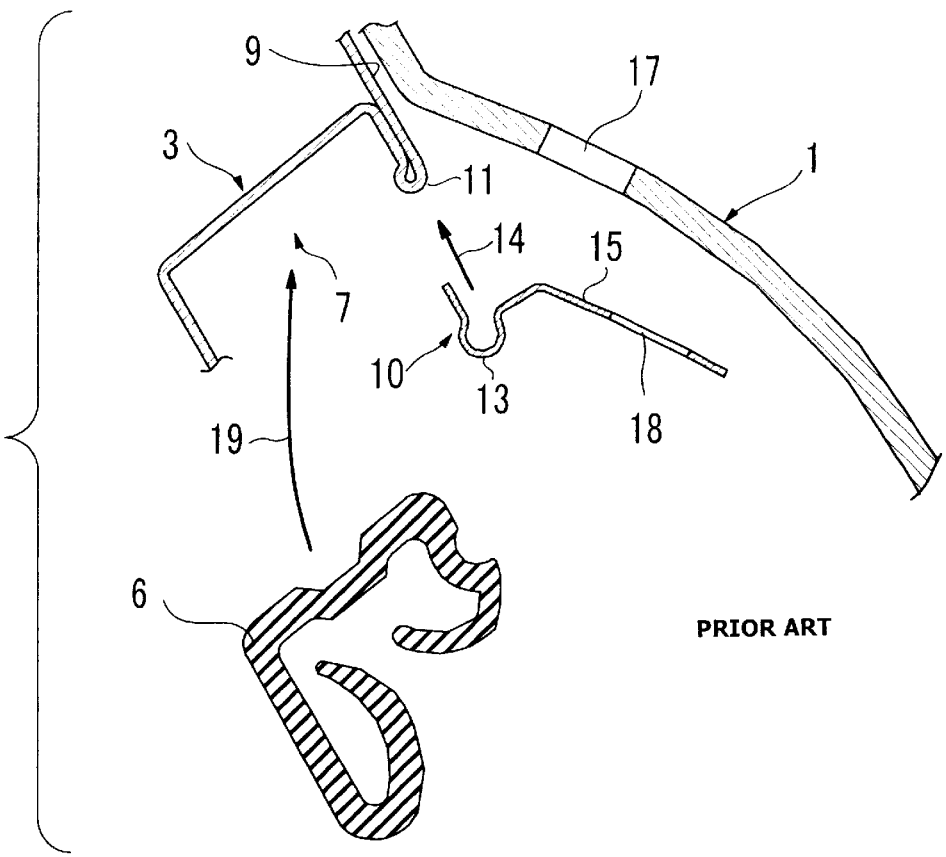
FIG. 2 is a sectional view showing the state before the side visor is fixed by use of a conventional side visor fastener, taken along the line A—A of FIG. 1.
Figure 3:
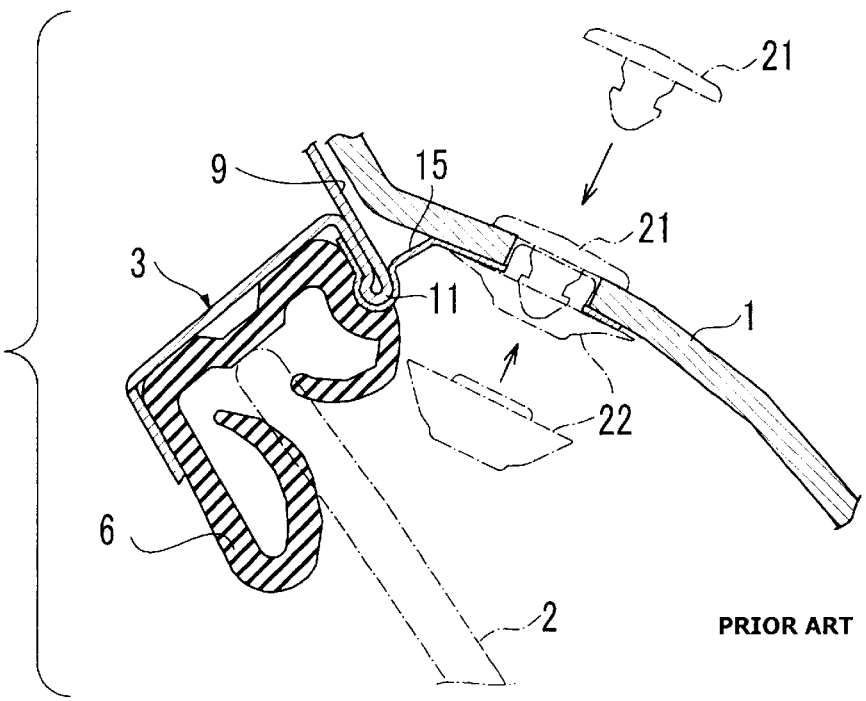
FIG. 3 is a sectional view showing the state after the side visor is fixed by use of the conventional side visor fastener, taken along the line A—A of FIG. 1.
Figure 4:
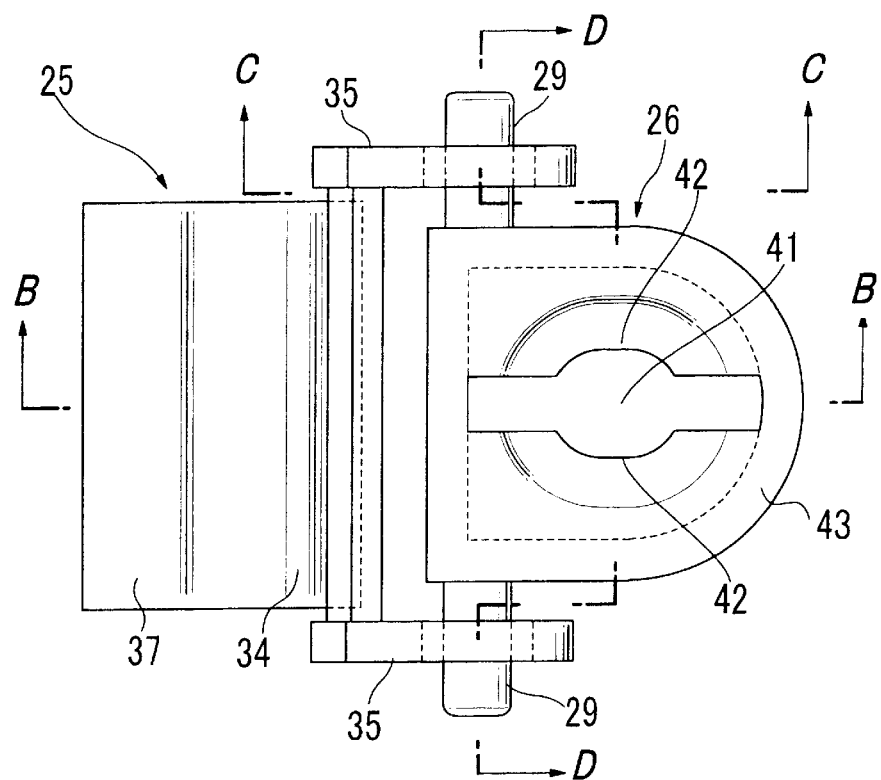
FIG. 4 is a top plan view of a retainer and a receiver clip element of a side visor fastener according to the present invention.
Figure 5:
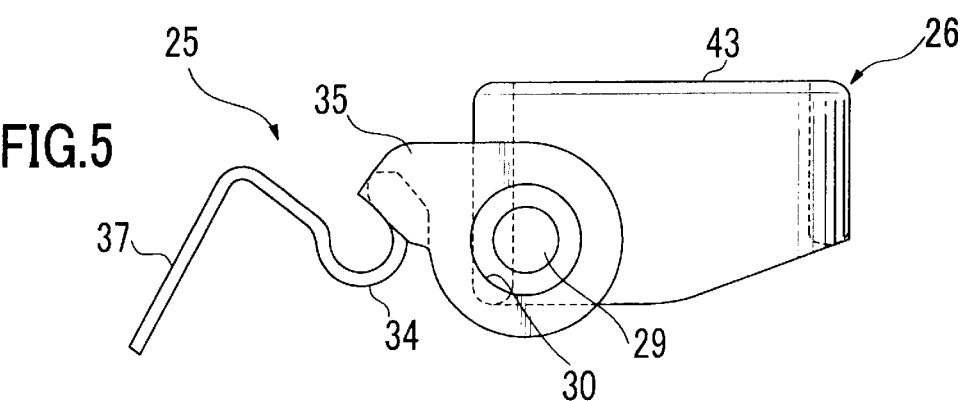
FIG. 5 is a front view of the retainer and the receiver clip element of FIG. 4.
Figure 6:
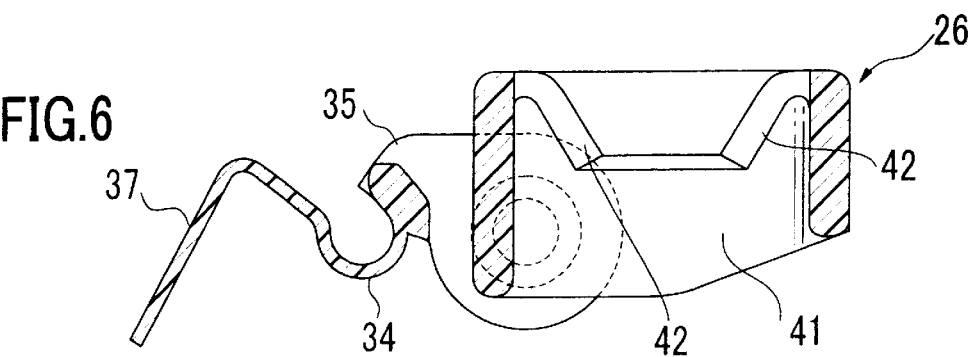
FIG. 6 is a sectional view of the retainer and the receiver clip element, taken along the line B—B of FIG. 4.
Figure 7:
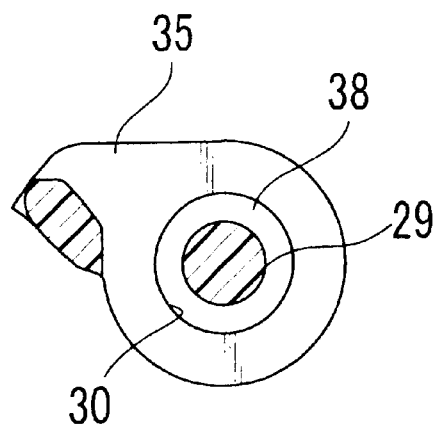
FIG. 7 is a sectional view of the retainer and the receiver clip element, taken along the line C—C of FIG. 4.
Figure 8:
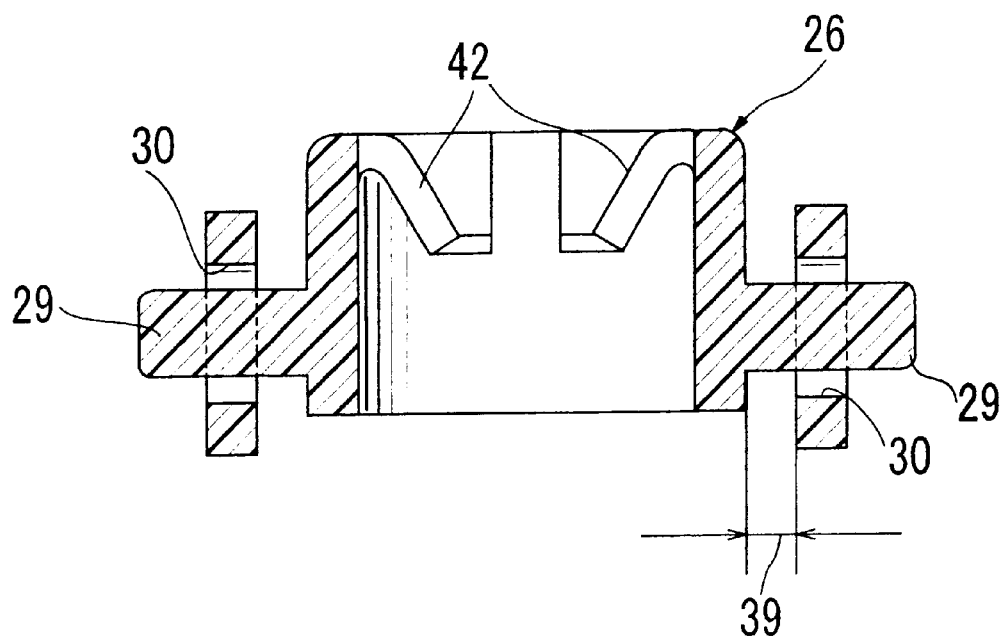
FIG. 8 is a sectional view of the retainer and the receiver clip element, taken along the line D—D of FIG. 4.

In FIGS. 4 to 8, the retainer 25 is formed as a plate member having a sufficient width in its entirety. The retainer 25 includes an attaching portion 34 to be attached to a thick bead 33 at the edge of a mounting portion 11 of the frame 3 such as a door frame in FIG. 10 (or FIG. 1) with clamping the thick bead 33, a pair of support arms 35 extending from the attaching portion 34 to hold the receiver clip element 25 from its both sides, and an extended portion 37 extending from the attaching portion 34 on the opposite side to the support arms 35. Each of the support arms 35 is formed with a bearing 30 (FIGS. 7 and 8) rotatably surrounding and supporting the corresponding end portion of a shaft 29 extending between opposite sides of the receiver clip element 26. Thus, the receiver clip element 26 is hingedly connected with the retainer 25 in a swingable manner to allow the connected receiver clip element 26 to serve as the portion of the fastener extending from the retainer to support the side visor 1. The extended portion 37 on the other side of the receiver clip element extends up to a retaining portion of the door frame 3 into which a sealing rubber 6 is fitted, so that the extended portion 37 can be pressed and held by the sealing rubber 6. This provides highly maintained mounting strength of the retainer 25 with respect to the mounting portion 11 regardless of the material that the retainer 25 is made of.

A certain radial clearance 38 (see FIG. 7) is provided between the shaft 29 and each of the bearings 30, which connect the retainer 25 with the receiver clip element 26. This can prevent an unconformity due to an offset in position between a swing axis of the receiver clip element 26 with respect to the retainer 25 and a center of angular (or inclination) variations of the side visor 1 with respect to the frame 3. In the preferred embodiment, the bearings 30 and the shaft 29 are provided in the retainer 25 and the receiver clip element 26, respectively, to connect the receiver clip element 26 with the retainer 25 in a swingable manner. However, as long as the swing motion can be achieved, the shaft and the bearings may be inversely provided in the retainer and the receiver clip element, respectively.

Further, between the shaft 29 and each of the bearings 30, a certain axial clearance 39 is provided to allow the shaft to be moved in the axial direction of the shaft within the extent that the disengagement therebetween is prevented. This can absorb a displacement between respective centers of the holes (the displacement in the longitudinal direction of the vehicle body).

The receiver clip element 26 is formed as a block having an upper surface serving as the portion of the fastener to be brought into surface contact with the rear side of the side visor 1 so as to support the side visor. The receiver clip element 26 is swingably connected with the retainer 25 through the shaft 29 at both sides of the receiver clip element 26, and a hole 41 for receiving therein a shank of the pin clip element 27 is provided at the central region of the receiver clip element 26. The inner edge defining the hole 41 is formed as a pair of engagement pawls 42 adapted to engage with an engagement head of the shank of the pin clip element 27 are provided. The upper surface 43 serving as the portion of the fastener to support the side visor has a relatively wide area allowing the rear side of the side visor 1 to be stably brought into surface contact therewith.

When the retainer 25 and the receiver clip element 26 are each made of plastic material, they may be molded in the same molding dies. Further, the retainer 25 and the receiver clip element 26 may be integrally molded by connecting them with one another through a thin wall in the bearings 29 and the shaft 30. In that case, the molding and machining processes are simplified. The retainer 25 and the receiver clip element 26 may also be connected with each other, for example, through a thin wall provided between the shaft 29 and each of the bearings 30. In that case, before the receiver clip element 26 swings with respect to the retainer 25, they are integrally connected with one another. Then, the thin wall is broken by swinging the receiver clip element 26 to establish a relationship allowing the swing motion through the shaft and the bearings. By integrally molding in these ways, the retainer and the receiver clip element can be managed as a single component, and the handling in the mounting operation can be simplified.

FIG. 9A is a top plan view of the pin clip element 27, FIG. 9B being a front view of the pin clip element 27, and FIG. 9C being a partial bottom view of the pin clip element 27. The pin clip element 27 can also be made of plastic material. The pin clip element 27 comprises a large flange 45 to be seated on the front side of the side visor 1 and a shank 46 extending downward from the flange 45. An enlarged engagement portion 47 is formed at the end (lower end) of the shank 46. Thus, when the shank 46 is inserted into the hole 41 of the receiver clip element 26, it can engage with the engagement pawls 42 to fasten the pin clip element 27 to the receiver clip element 26.

With reference to FIGS. 10 and 11, explanation will be made as to an operation for fixing the side visor 1 to the frame 3 such as a door frame by use of the side visor fastener 31 comprising the retainer 25, the receiver clip element 26 and the pin clip element 27. In FIG. 10, for fixing the side visor 1 to the frame 3, the upper portion of the side visor 1 is first attached to the bonding surface 9 of the door frame 3 by means of a double-sided adhesive tape or the like. Then, the attaching portion 34 of the retainer 25 is pushed into the portion 33 of the mounting portion 11 of the frame 3 as shown by the arrow 50 to fix the retainer 25 to the frame 3. Because the receiver clip element 26 is swingably connected with the retainer 25, the receiver clip element 26 is attached to the frame 3 as is. Thus, the receiver clip element 26 serves as the portion of the fastener extending along the rear side of the side visor 1 to support the side visor. Even if the inclination of the side visor 1 with respect to the frame 3 is varied depending on the type of the side visor 1, the upper surface of the receiver clip element 26 is stably brought into contact with the rear side of the side visor 1 by swinging the receiver clip element 26 in response to variations of the inclination because the receive clip element 26 is swingably connected to the retainer 25 through the shaft 29 and the bearings 30. Through this attaching operation, the hole 41 of the receive clip element 26 is aligned with the fastening hole 17 of the side visor 1. When the attaching portion 34 of the retainer 25 is attached to the mounting portion 11 of the frame 3, the extended portion 37 of the retainer 25 is seated on the bottom surface of the retaining portion 7 of the frame 3.

Then, the sealing rubber 6 is pushed into the retaining portion 7 of the frame 3 as shown by the arrow 51 and is held therein. Through this push-in operation, the extended portion 37 of the retainer 25 is pressed and held by the sealing rubber 6 in the retaining portion 7. This can provide highly maintained mounting strength of the retainer with respect to the frame 3 even if the retainer 25 is made of plastic material, to prevent the attaching portion 34 of the retainer 25 from disengaging from the mounting portion 11 of the frame 11. In this state, as shown by the phantom line (or chain line) in FIG. 11, with taking the pin clip element 27 by hand, the shank 46 of the pin clip element 27 is inserted into the hole between the pair of engagement paws 42 of the receiver clip element 26 through the fastening hole 17 of the side visor 1. Thus, the engagement portion 47 of the shank 46 of the pin clip element engages with the engagement pawls 42 of the receiver clip element 26, and thereby the side visor 1 is sandwiched between the flange 45 of the pin clip element 27 and the receiver clip element 26. As described previously, the receiver clip element 26 is connected with the retainer 25 and the retainer 25 is fixed to the mounting portion 11 of the frame 3. Thus, the side visor 1 is fixed to the frame 3 through the receiver clip element 26 and the retainer 25.

Referring to FIG. 12, description will be made on the possibility of an unconformity due to an offset in position between a swing axis 53 of the receiver clip element 26 with respect to the retainer 25 (the hinge axis of the shaft 29 and the bearings 30) and a center 54 of angular variations of the side visor 1, and the reason why the fastener of the present invention can absorb the unconformity. The offset in position between the swing axis 53 of the receiver clip element 26 with respect to the retainer 25 and the center 54 of angular variations of the side visor 1 can cause a gap 55 between the upper surface of the receiver clip element 26 and the rear side of the side visor 1. The side visor 1 could be vibrated in response to the vehicle vibration in the range of the gap 55 with respect to the receiver clip element 26. To this end, the radial clearance 38 (see FIG. 7) is provided between the shaft 29 and each of the bearings 30, which connect the receiver clip element 26 with the retainer 25, as described above. Thus, the receiver clip element 26 can move toward the rear side of the side visor 1 by the distance of the clearance 38 to compensate or eliminate the gap 55 in FIG. 12. This can absorb the unconformity due to the offset in position between the swing axis of the receiver clip element with respect to the retainer and the center of angular variations of the side visor.

Figure 13:
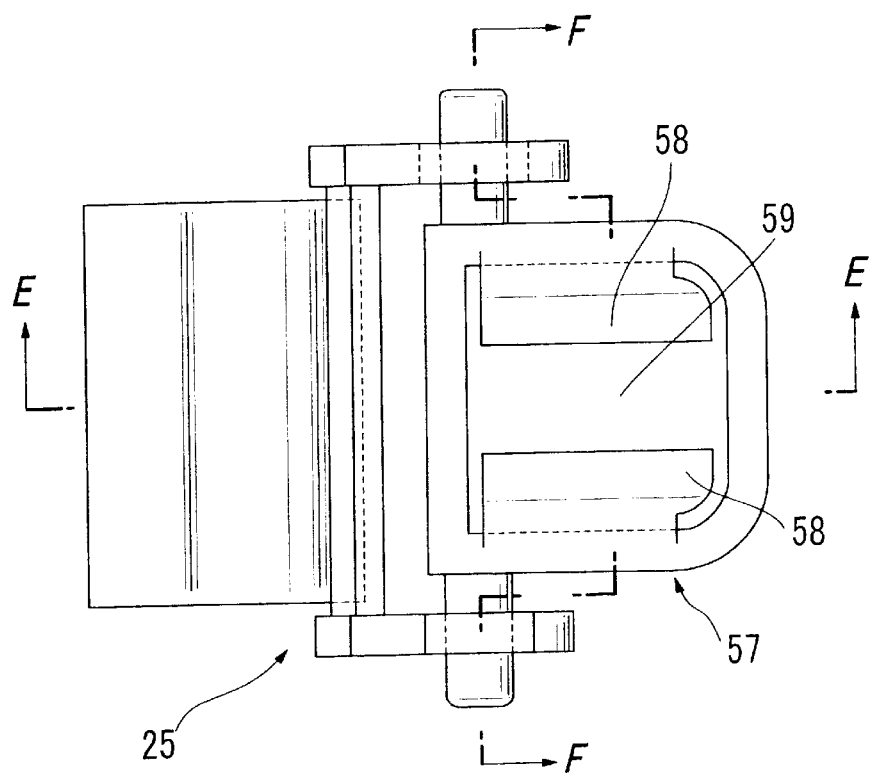
FIG. 13 is a top plan view showing a second embodiment of the present invention which includes a modification of the receiver clip element and the retainer connected therewith.
Figure 14:
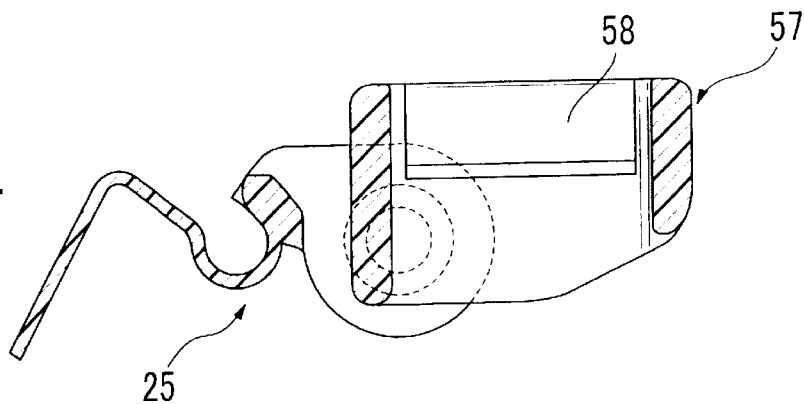
FIG. 14 is a sectional view of the receiver clip element and the retainer, taken along the line E—E of FIG. 13.
Figure 15:
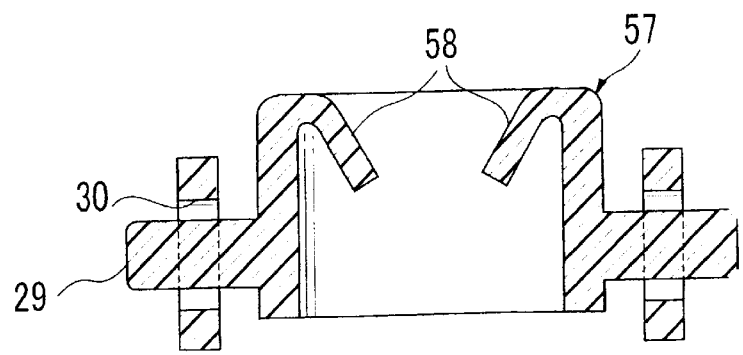
FIG. 15 is a sectional view of the receiver clip element and the retainer, taken along the line F—F of FIG. 13.

FIGS. 13 to 15 show a second embodiment of the present invention wherein a receiver clip element 57 is depicted. A retainer 25, a bearing 30 and a shaft 29 are the same as those of the above embodiment. In the receiver clip element 57 of the second embodiment, a pair of engagement pawls 58 are formed as a pair of plate portions extending in the longitudinal direction of the retainer 25. This can absorb a displacement in the longitudinal direction of the retainer (or the crosswise direction of the side visor 1) between a pin-clip element receiving hole 59 of the receiver clip element 57 and the fastening hole of the side visor 1.

According to the present invention, the receiver clip element can swing with respect to the retainer in line with the inclination of the side visor with respect to the frame, and the receiver clip element serves as the portion of the fastener extending from the retainer to support the side visor. Thus, even if a mounting angle (or the inclination) of the side visor with respect to the frame varies, the side visor can be adequately supported only by swinging the receiver clip element with respect to the retainer in each case. That is, even if the angle of the side visor is varied, a structurally and dimensionally identical fastener comprising the retainer and the receiver and pin clip elements can be used. This solves the problem of undesirable costs and times for preparing the various kinds of the retainers and managing them, and eliminates the risk of occurrence of the wrong assembly of improper retainers, during the operation for fixing the retainer to the frame.

In general, the above-identified embodiments are not to be construed as limiting the breadth of the present invention. It is understood that other modifications or other alternative constructions will be apparent which are within the scope of the invention as defined in the appended claims.

What is claimed is:

1. A side visor fastener for fixing a side visor to a frame of a vehicle body, comprising:
   a. a retainer to be fixed to a mounting portion of said frame;
   b. a clip for fastening said side visor to a portion of the fastener extending from the retainer as fixed to said frame to said side visor;
   c. said clip including a receiver clip element adapted to be disposed on the rear side of said side visor and a pin clip element to be inserted from the front side of said side visor into said receiver clip element through said side visor to engage with said receiver clip element;
   d. a bearing formed on said retainer;
   e. a shaft mounted in the bearing to hingedly connect said retainer in a swingable manner in response to the inclination of said side visor with respect to said frame; and
   f. said receiver clip element to serve as a portion of the fastener extending from said retainer to support said side visor, whereby said side visor is fixed to said frame through said retainer while said visor is sandwiched between said receiver clip element and said pin clip element.

2. The side visor fastener claimed claim 1, wherein:
   a. both said retainer and receiver clip elements are made of plastic material.

3. The side visor fastener claimed in claim 2, wherein:
   a. said retainer and said receiver clip elements are integrally molded with each other.

4. The side visor fastener claimed in claim 3, wherein:
   a. said frame defines a door frame;
   b. a door glass is received in the door frame;
   c. said door frame is formed with a retaining portion;
   d. a sealing rubber for receiving said door grass is mounted in the retaining portion of the door frame;
   e. said retainer includes an extended portion extending from said mounting portion of the door frame to said retaining portion of the door frame; and
   f. said extended portion of said retainer being pressed and held by said sealing rubber in said retaining portion.

5. The side visor fastener claimed in claim 4, wherein:
   a. said shaft and said bearing are connected to each other with a predetermined radial clearance therebetween for preventing an unconformity due to an offset in position between a swing axis of said receiver clip element with respect to said retainer and a center of angular variations of said side visor.

6. The side visor fastener claimed in claim 5, wherein:
   a. said receiver clip element has engagement pawls formed in a plate shape extending in the longitudinal direction of said retainer; and
   b. said pin clip element has an enlarged engagement portion that is received into and through the engagement pawls to be connected therein.

7. The side visor fastener claimed in claim 6, wherein:
   a. said shaft and said bearing have a predetermined axial clearance allowing one of them to be moved in the axial direction of said shaft to prevent the disengagement therebetween.

* * * * *